US012008897B2

(12) United States Patent
Kwoczek et al.

(10) Patent No.: US 12,008,897 B2
(45) Date of Patent: Jun. 11, 2024

(54) METHODS, COMPUTER PROGRAMS, APPARATUSES, VEHICLE AND CONTROL CENTER FOR RESOLVING A DEADLOCK TRAFFIC SITUATION OF A VEHICLE

(71) Applicant: VOLKSWAGEN AKTIENGESELLSCHAFT, Wolfsburg (DE)

(72) Inventors: Andreas Kwoczek, Lehre (DE); Guillaume Jornod, Berlin (DE); Andreas Pfadler, Berlin (DE); Israel Gonzalez Vazquez, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 362 days.

(21) Appl. No.: 17/467,191

(22) Filed: Sep. 4, 2021

(65) Prior Publication Data
US 2022/0076568 A1 Mar. 10, 2022

(30) Foreign Application Priority Data
Sep. 8, 2020 (EP) .................................... 20195049

(51) Int. Cl.
*G08G 1/01* (2006.01)

(52) U.S. Cl.
CPC ......... *G08G 1/0145* (2013.01); *G08G 1/0112* (2013.01); *G08G 1/0133* (2013.01)

(58) Field of Classification Search
CPC ... G08G 1/0145; G08G 1/0112; G08G 1/0133
See application file for complete search history.

(56) References Cited

U.S. PATENT DOCUMENTS 9,507,346 B1 11/2016 Levinson et al.
11,454,512 B2 9/2022 Pfadler et al.
(Continued)

FOREIGN PATENT DOCUMENTS

CN 206711387 U * 12/2017
CN 111564052 A 8/2020
(Continued)

OTHER PUBLICATIONS

Search Report for European Patent Application No. 20195049.0; dated Nov. 26, 2020.
(Continued)

*Primary Examiner* — Behrang Badii
*Assistant Examiner* — Jay Khandpur
(74) *Attorney, Agent, or Firm* — Barnes & Thornburg LLP

(57) ABSTRACT

Methods, computer programs, apparatuses, a transportation vehicle, and a control center for resolving a deadlock traffic situation of a transportation vehicle. The method includes detecting the deadlock traffic situation, reporting the deadlock traffic situation to a control center, entering a tele-operated driving session in coordination with the control center, determining information on an identification of the deadlock traffic situation in coordination with the control center, forwarding the information on the identification of the deadlock situation to other transportation vehicles, and resolving the deadlock traffic situation using tele-operation by the control center.

17 Claims, 4 Drawing Sheets

(56) References Cited

U.S. PATENT DOCUMENTS

| | | | |
|---|---|---|---|
| 2013/0162448 A1* | 6/2013 | Mochizuki | G08G 1/056 |
| | | | 340/905 |
| 2019/0011912 A1 | 1/2019 | Lockwood et al. | |
| 2019/0061765 A1* | 2/2019 | Marden | B60W 30/18163 |
| 2020/0111169 A1* | 4/2020 | Halder | G01C 21/3697 |
| 2020/0226853 A1 | 7/2020 | Ahmed et al. | |
| 2020/0239030 A1 | 7/2020 | Kwoczek et al. | |
| 2020/0242920 A1 | 7/2020 | Pfadler et al. | |
| 2020/0256697 A1* | 8/2020 | Pfadler | G05D 1/0212 |
| 2023/0045323 A1* | 2/2023 | Li | H04W 12/08 |

FOREIGN PATENT DOCUMENTS

| | | |
|---|---|---|
| WO | 2005054792 A1 | 6/2005 |
| WO | 2019180700 A1 | 9/2019 |

OTHER PUBLICATIONS

Office Action; Chinese Patent Application No. 202111048660.3; Jan. 10, 2024.

* cited by examiner

METHODS, COMPUTER PROGRAMS, APPARATUSES, VEHICLE AND CONTROL CENTER FOR RESOLVING A DEADLOCK TRAFFIC SITUATION OF A VEHICLE

PRIORITY CLAIM

This patent application claims priority to European Patent Application No. 20195049.0, filed 8 Sep. 2020, the disclosure of which is incorporated herein by reference in its entirety.

SUMMARY

Illustrative embodiments relate to methods, computer programs, apparatuses, a transportation vehicle, and a control center for resolving a deadlock traffic situation of a transportation vehicle, more specifically, but not exclusively, to a concept for enabling efficient handling of multiple transportation vehicles facing the same deadlock situation.

BRIEF DESCRIPTION OF THE DRAWINGS

Disclosed embodiments will be described with reference to the accompanying figures, in which.

DETAILED DESCRIPTION

Figure 1:
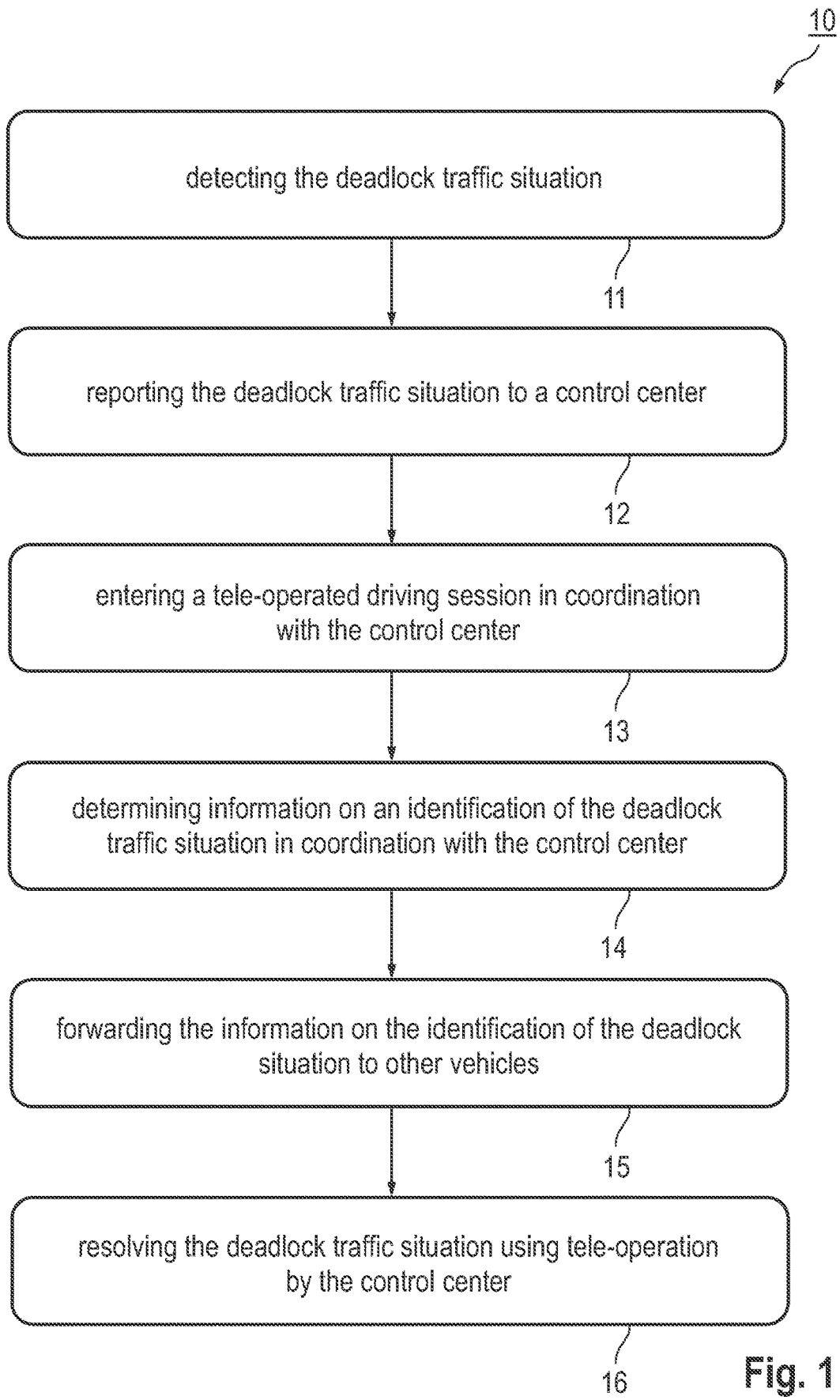
FIG. 1 illustrates a block diagram of an exemplary embodiment of a method for resolving a deadlock traffic situation in an autonomously operated transportation vehicle.

Vehicular communication is a field of research and development. To enable an autonomous or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay and data rate are to be expected. The CC controls the automated vehicle (AV) via remote control. In direct control the CC directly controls one or more actuators of the AV.

Document WO 2019/180700 A1 describes a concept using a vehicular artificial intelligence (AI) unit, which is configured: to receive inputs from a plurality of vehicular sensors of a transportation vehicle; to locally process within the transportation vehicle at least a first portion of the inputs; to wirelessly transmit via a vehicular wireless transmitter at least a second portion of the inputs to a remote tele-driving processor located externally to the transportation vehicle; to wirelessly receive via a vehicular wireless receiver from the remote tele-driving processor, a remotely-computed processing result that is received from a remote Artificial Intelligence (AI) unit; and to implement a vehicular operating command based on the remotely-computed processing result, via an autonomous driving unit of the transportation vehicle or via a tele-driving unit of the transportation vehicle.

Document US 2019/0011912 A1 discloses a method for operating a driverless transportation vehicle that may include receiving, at the driverless transportation vehicle, sensor signals related to operation of the driverless transportation vehicle, and road network data from a road network data store. The method may also include determining a driving corridor within which the driverless transportation vehicle travels according to a trajectory, and causing the driverless transportation vehicle to traverse a road network autonomously according to a path from a first geographic location to a second geographic location. The method may also include determining that an event associated with the path has occurred, and sending communication signals to a teleoperations system including a request for guidance and one or more of sensor data and the road network data. The method may include receiving, at the driverless transportation vehicle, teleoperations signals from the teleoperations system, such that the transportation vehicle controller determines a revised trajectory based at least in part on the teleoperations signals.

The prior art concepts describe sharing information about the environment, including obstacles, between transportation vehicles so the individual transportation vehicles can benefit from other sensor data. However, although improved environmental knowledge or models may also improve ToD, still in a deadlock situation, i.e., a situation that cannot be resolved by a transportation vehicle alone, further information on the environment does not help improving a signaling or resource efficiency of an overlaying communication system or with the signaling involved in tele-operating the transportation vehicles out of the respective situations.

There is a demand for an improved concept for ToD of transportation vehicles in deadlock situations. This demand is fulfilled according to the independent claims.

Disclosed embodiments are based on the finding that ToD information can be reused for transportation vehicles in the same deadlock situation. Typically, transportation vehicles will queue up if a deadlock situation (e.g., a sudden obstacle) occurs and then independently seek help from a ToD control center. It is a finding that once the deadlock situation or the ToD session solving the deadlock situation can be identified it can be re-used by other transportation vehicles facing the same deadlock situation.

Disclosed embodiments provide a method for resolving a deadlock traffic situation in an autonomously operated transportation vehicle. The method comprises detecting the deadlock traffic situation and reporting the deadlock traffic situation to a control center. The method further comprises entering a tele-operated driving session in coordination with the control center and determining information on an identification of the deadlock traffic situation in coordination with the control center. The method comprises forwarding the information on the identification of the deadlock situation to other transportation vehicles and resolving the deadlock traffic situation using tele-operation by the control center. Other transportation vehicles can hence identify the deadlock situation and use this information in their requests.

The method may further comprise receiving information on an identification of a tele-operation session from the control center and forwarding the information on the identification of the tele-operation session to the other transportation vehicles. Transportation vehicles can then refer to the tele-operation session in their request and therewith already reference a ToD session that solved the deadlock situation before.

For example, the determining of the information on the identification of the deadlock traffic situation in coordination with the control center comprises assigning the identification to the deadlock traffic situation and reporting the information on the assigned identification of the deadlock traffic situation to the control center. In such an exemplary embodiment a first transportation vehicle discovering the deadlock situation can set an identification, which can then be communicated to the control center and transportation vehicles behind for referencing.

Disclosed embodiments also provide a method for resolving a deadlock traffic situation in an autonomously operated transportation vehicle. The method comprises receiving information on an identification of a deadlock traffic situation from another transportation vehicle and verifying that the information on the identification refers to an upcoming deadlock traffic situation. The method further comprises reporting the information on the identification to a control center and entering a tele-operated driving session in coordination with the control center to resolve the deadlock traffic situation if it comes up. Reception of the information on the identification and using it as reference may ease the process of finding a path that resolves the deadlock situation at the control center, as information of the solution of the deadlock situation with this identification may already be available.

The method may further comprise receiving information on an identification of a tele-operation session from the other transportation vehicle and reporting the information on the identification of the tele-operation session to the control center. Using the identification of the ToD session may further help identifying a solution for the deadlock situation at the control center.

For example, the information on the identification of the tele-operation session indicates a tele-operation session of a specific control center and the reporting comprises reporting to the specific control center. Hence, once the information on the identification is received a control center that has resolved the situation before may also be identified.

In some exemplary embodiments the verifying may comprise determining whether the autonomously operated transportation vehicle is in queue behind the other transportation vehicle. Hence it may be verified that a queue or jam happens because of a deadlock situation so to distinguish this situation from one that occurs, for example, because of a traffic light of high traffic density.

Disclosed embodiments further provide a method for resolving a deadlock traffic situation of an autonomously operated transportation vehicle in a control center. The method comprises receiving information on a deadlock traffic situation from the autonomously operated transportation vehicle and determining information on an identification of the deadlock situation. The method further comprises tele-operating the transportation vehicle to resolve the deadlock traffic situation and storing information on the deadlock traffic situation for later use. The storing of the information on the deadlock situation may enable re-use and identification of a solution for the deadlock situation once determined.

The method may further comprise determining information on an identification of a tele-operation session used for tele-operating the transportation vehicle to resolve the deadlock traffic situation and providing the information on the identification of the tele-operated driving session to the transportation vehicle. The transportation vehicle may thereby be enabled to communicate the information further on to other transportation vehicles, which can then make reference to it.

In some exemplary embodiments the method may further comprise receiving information on the identification of the deadlock traffic situation from another transportation vehicle and retrieving the information on the deadlock traffic situation based on the information on the identification of the deadlock situation. The method further comprises tele-operating the other transportation vehicle based on the information on the deadlock traffic situation. Disclosed embodiments may enable efficient re-use of information that resolve deadlock traffic situations.

The method may further comprise receiving information on a tele-operation session from the other transportation vehicle and coordinating the tele-operating of the other transportation vehicle based on the information on the tele-operation session. If information on a ToD-session is already reported by a transportation vehicle, information on that session can be re-used, even if it is referring to another control center.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Another disclosed embodiment is an apparatus for resolving a deadlock traffic situation of a transportation vehicle. The apparatus comprises one or more interfaces configured to communicate in a communication network and a control module, which is configured to control the one or more interfaces. The control module is further configured to perform one of the methods described herein. Further exemplary embodiments are a transportation vehicle and a control center comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method for resolving a deadlock traffic situation in an autonomously operated transportation vehicle. The method comprises detecting 11 the deadlock traffic situation and reporting 12 the deadlock traffic situation to a control center. The method 10 further comprises entering 13 a tele-operated driving session in coordination with the control center and determining 14 information on an identification of the deadlock traffic situation in coordination with the control center. The method 10 further comprises forwarding 15 the information on the identification of the deadlock situation to other transportation vehicles and resolving 16 the deadlock traffic situation using tele-operation by the control center.

Disclosed embodiments may provide a method to manage automated transportation vehicles queuing in a deadlock situation. Tele-operating the transportation vehicle is to be understood as a remote operation of the transportation vehicle. For example, a remote operator or tele-operator located at a control center (CC) takes over control of the transportation vehicle by control commands (e.g., acceleration/deceleration commands, steering commands, etc.). Tele-operated driving (ToD) might become a key technology to solve issues with L4/L5 (L4: highly automatic, L5: fully automatic) driven transportation vehicles, such as interpretation issues or deadlocks (situations, which cannot be resolved by autonomous or automatic control mechanisms only).

These issues occur when automatic driven vehicles (AV) are not able to interpret and to solve a situation (also referred to as deadlock) due to not clear traffic conditions, e.g., an accident or a construction site. These transportation vehicles may need external instruction from someone else to solve the situation, which can be the so-called control center (CC). A ToD vehicle will be driven remotely in a ToD session by a CC, an operator therein, respectively.

Such a deadlock situation may be detected by the transportation vehicle using onboard sensor systems. There are multiple options on determining the environmental information in exemplary embodiments. For example, information related to the environment may be obtained by sensor data of the transportation vehicle itself (video, radar, lidar, etc.) or through communication with other transportation vehicles, e.g., Vehicle-to-Vehicle (V2V, Car-to-Car) communication. Information related to the environment may comprise determining the information related to the environment based on sensor data shared among transportation vehicles in the environment of the transportation vehicle (data from sensors of other transportation vehicles).

The ToD performance is related to the communication link performance. The communication link may comprise a wireless part and wired part and a Quality of Service (QoS) may relate at least to the wireless part in some disclosed embodiments. For example, the communication link comprises the air interface (Uu link in 3GPP (3rd Generation Partnership Project), wireless part of the communication link) between the transportation vehicle and the base station (access node) and then the connection through the operator backbone (core network, wired part). Depending on the quality of the link, the control of the transportation vehicle will be adapted in exemplary embodiments: the transportation vehicle will be controlled directly (joystick-like) or indirectly (waypoints, or environmental model editions). The environment may be characterized by the type of road, e.g., highway, country road, city road, residential area road, number of lanes, traffic density, traffic dynamics, etc. Moreover, the time of day, the day of week, the weather, current traffic condition/density; and other factors may be comprised in the information related to the environment of the tele-operated transportation vehicle. Communicating all this information may consume significant bandwidth and radio capacity.

In disclosed embodiments, the information on the identification (ID) of a deadlock situation may enable to identify the same deadlock situation for another transportation vehicle. Identifying the same deadlock situation may enable reuse of information for resolving the deadlock situation. For example, the information on the identification may be an identifier number large enough, so it is unique within a certain time frame and region to avoid that different deadlock situations in proximity are assigned the same identification. The communication of the IDs may be done via a direct link, e.g., Dedicated Short Range Communication (DSRC), as transportation vehicles are in the queue they can directly communicate. Transportation vehicles may leverage their position in a queue to use direct communication.

For example, multiple transportation vehicles arrive subsequently at the same deadlock situation, e.g., an accident or a road construction. If all transportation vehicles enter a ToD session once they arrive at the deadlock situation a significant communication overhead occurs as all transportation vehicles communicate the same information to their CCs. The queued or blocked transportation vehicles are then moved out of the deadlock situation one by one in subsequent independent ToD sessions.

In exemplary embodiments, the forwarding of the information on the identification allows subsequent transportation vehicles to make reference to the deadlock situation. This reference may allow a CC to identify the deadlock situation and make reuse of former information regarding the deadlock situation itself (accident, construction, blocking transportation vehicle, pedestrian on the street, etc.) and information for resolving the deadlock situation, e.g., trajectory, alternative routes, waypoints, etc.

In disclosed embodiments the method 10 may further comprise receiving information on an identification of a tele-operation session from the control center and forwarding the information on the identification of the tele-operation session to the other transportation vehicles. The information on the identification of the ToD session may also be a number identifier that allows identifying the ToD session in (pseudo) unique manner to avoid ambiguities. The other transportation vehicle may then not only make reference to the deadlock situation but also to a ToD session that was previously used to solve the ToD session. Herein, a tele-operated driving session specifies the situation or context in which a transportation vehicle is actually maneuvered or remote controlled out of a deadlock situation. This session may be referred to as a tele-operation session afterwards and it may be identified using information on an identification of the tele-operation session.

For example, the determining 14 of the information on the identification of the deadlock traffic situation in coordination with the control center may comprise assigning the identification to the deadlock traffic situation and reporting the information on the assigned identification of the deadlock traffic situation to the control center. In this case the transportation vehicle may assign the information on the identification. In other exemplary embodiments the CC may assign the information on the identification.

Figure 2:
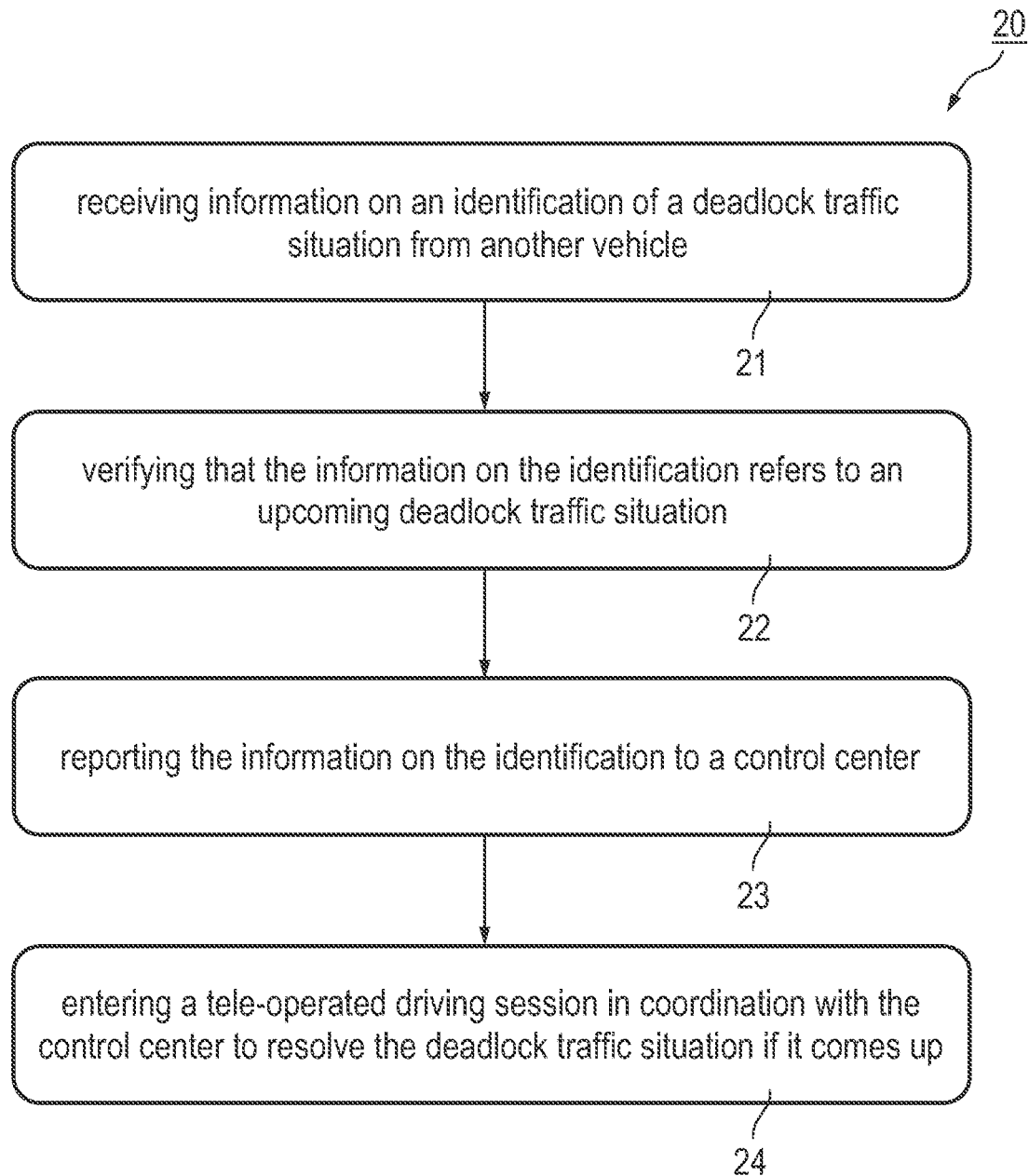
FIG. 2 illustrates a block diagram of an exemplary embodiment of a method for resolving a deadlock traffic situation in an autonomously operated transportation vehicle.

FIG. 2 illustrates a block diagram of an exemplary embodiment of a method 20 for resolving a deadlock traffic situation in an autonomously operated transportation vehicle. Method 20 is formulated from the perspective of a transportation vehicle in queue behind a transportation vehicle that is directly facing the deadlock situation. The method 20 comprises receiving 21 information on an identification of a deadlock traffic situation from another transportation vehicle and verifying 22 that the information on the identification refers to an upcoming deadlock traffic situation. The method 20 further comprises reporting 23 the information on the identification to a control center and entering 24 a tele-operated driving session in coordination with the control center to resolve the deadlock traffic situation if it comes up.

The method 20 may further comprise receiving information on an identification of a tele-operation session from the other transportation vehicle and reporting the information on the identification of the tele-operation session to the control center. That way, the ToD session can also be identified, which may further increase efficiency, as information on the referenced ToD session may be already available.

For example, the information on the identification of the tele-operation session indicates a tele-operation session of a specific control center and the reporting comprises reporting to the specific control center. Hence, in some exemplary embodiments the CC may be identified at the transportation vehicle and a ToD request may then be directed to the CC. In some other disclosed embodiments, the transportation vehicle may always report to a CC of its operator and the CC may then identify another CC based on the identification. Information on the ToD session may then be retrieved from the other CC or the other CC may be put in charge for the ToD session of the requesting transportation vehicle.

In some exemplary embodiments the verifying 22 comprises determining whether the autonomously operated transportation vehicle is in queue behind the other transportation vehicle. For example, the verifying 22 may be done using sensors of the transportation vehicle to detect whether it is in line and whether one of the transportation vehicles in front has identified the deadlock situation. One mechanism that may be used in exemplary embodiments is to check a data base, with information on deadlocks on the planned route. If a transportation vehicle in front has reported the deadlock to the data base a transportation vehicle behind can verify by checking a deadlock identification as received by the transportation vehicle against the data base.

Figure 3:
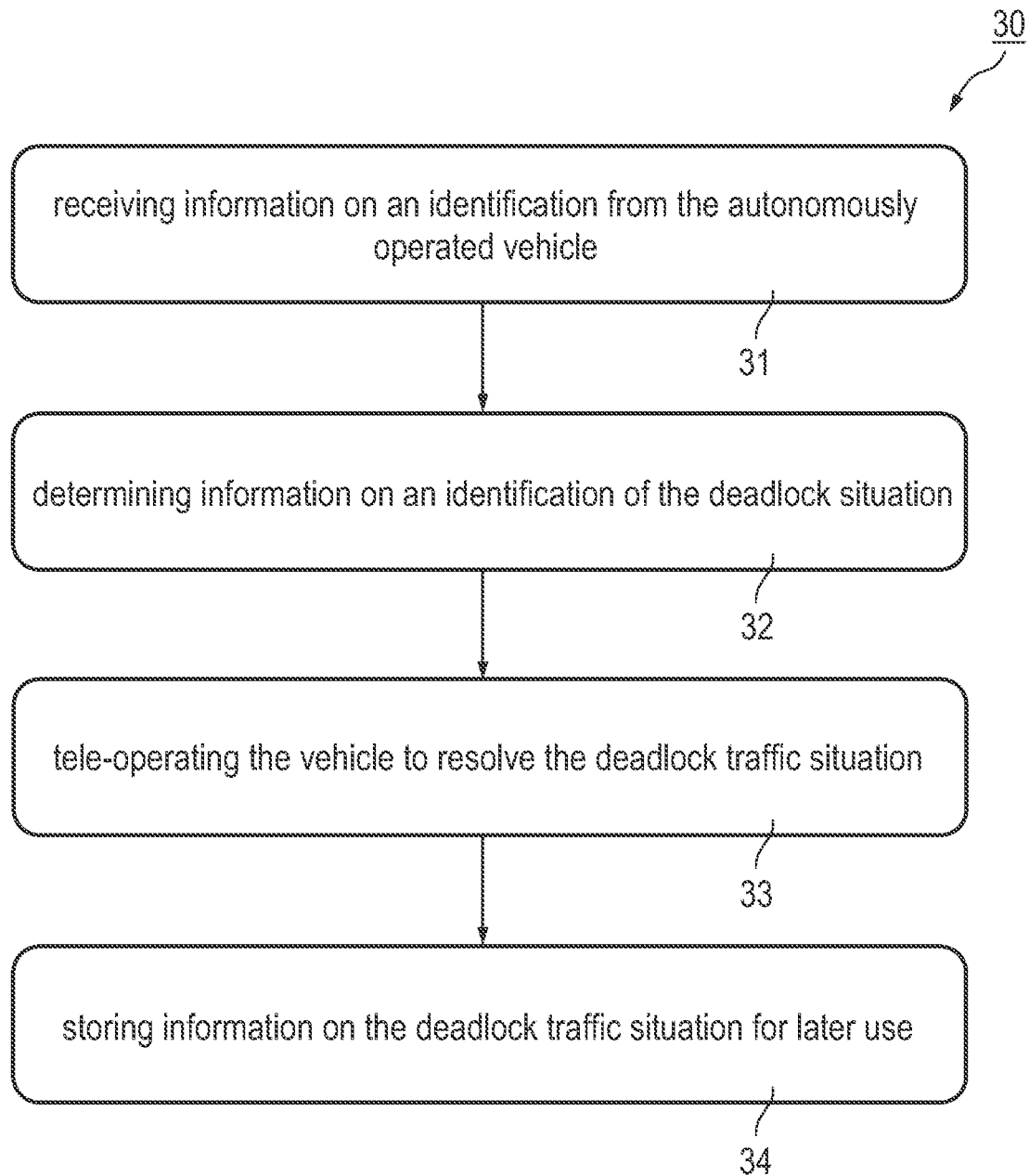
FIG. 3 illustrates a block diagram of an exemplary embodiment of a method for resolving a deadlock traffic situation of an autonomously operated transportation vehicle in a control center.

FIG. 3 illustrates a block diagram of an exemplary embodiment of a method 30 for resolving a deadlock traffic situation of an autonomously operated transportation vehicle in a control center. The method 30 is formulated from the perspective of the control center. The method 30 comprises receiving 31 information on a deadlock traffic situation from the autonomously operated transportation vehicle and determining 32 information on an identification of the deadlock situation. The method 30 further comprises tele-operating 33 the transportation vehicle to resolve the deadlock traffic situation and storing 34 information on the deadlock traffic situation for later use.

The method 30 may further comprise determining information on an identification of a tele-operation session used for tele-operating the transportation vehicle to resolve the deadlock traffic situation and providing the information on the identification of the tele-operation session to the transportation vehicle. As outlined above such determination of the information on the identification may be carried out on the transportation vehicle's side, e.g., the transportation vehicle, which arrives at the deadlock first, or on the CC's side, e.g., the CC, which receives the first request for a ToD to resolve the deadlock.

For example, the method 30 may further comprise receiving information on the identification of the deadlock traffic situation from another transportation vehicle and retrieving the information on the deadlock traffic situation based on the information on the identification of the deadlock situation. The method 30 may further comprise tele-operating the other transportation vehicle based on the information on the deadlock traffic situation. In this disclosed embodiment, the CC makes use of information determined during a former ToD session for the same deadlock, e.g., it reuses a trajectory or waypoints. The method 20 may further comprise receiving information on a tele-operation session from the other transportation vehicle and coordinating the tele-operating of the other transportation vehicle based on the information on the tele-operation session. As outlined above, information on a ToD identification may likewise be received from another transportation vehicle.

Figure 4:
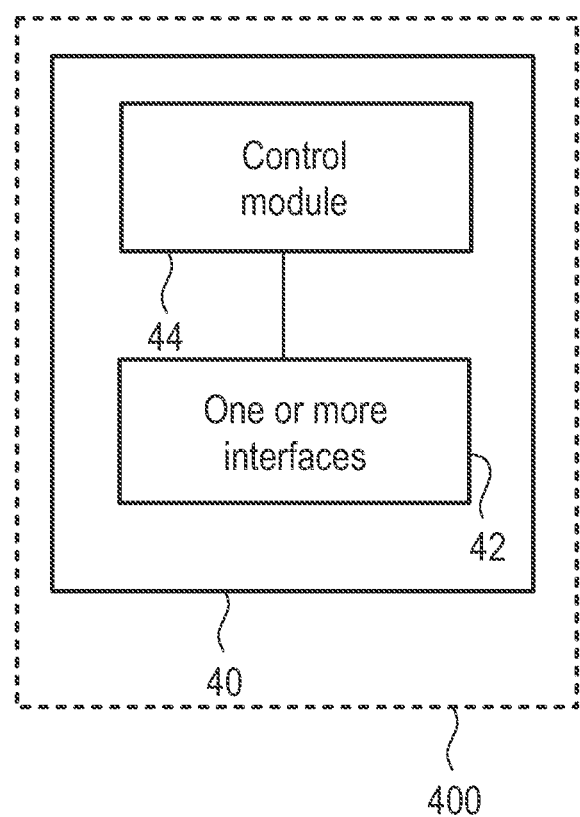
FIG. 4 illustrates a block diagram of an exemplary embodiment of an apparatus for resolving a deadlock traffic situation of a transportation vehicle, an exemplary embodiment of a transportation vehicle, and an exemplary embodiment of a network component or control center.

FIG. 4 illustrates a block diagram of an exemplary embodiment of an apparatus for resolving a deadlock traffic situation of a transportation vehicle, an exemplary embodiment of a transportation vehicle, and an exemplary embodiment of a network component or control center. The apparatus comprises one or more interfaces 42 configured to communicate in a communication network and a control module 44, which is coupled to the one or more interfaces, and which is configured to control the one or more interfaces 42. The control module 44 is further configured to perform any of the methods 10, 20, 30 described herein. Other disclosed embodiments are a transportation vehicle 400 comprising the apparatus 40, a network entity 400 comprising the apparatus 40, and a control center 400 comprising the apparatus 40.

The apparatus 40 and the transportation vehicle, control center, or network component 400 may communicate at least partly through a mobile communication system. The mobile communication system, may, for example, correspond to one of the Third Generation Partnership Project (3GPP)-standardized mobile communication networks, where the term mobile communication system is used synonymously to mobile communication network. The messages (input data, control information) may hence be communicated through multiple network nodes (e.g., internet, router, switches, etc.) and the mobile communication system, which generates the delay or latencies considered in exemplary embodiments. For example, the uplink direction refers to the direction from a transportation vehicle to the command center and the downlink direction refers from the command center to the transportation vehicle.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system comprising two or more mobile transceivers/vehicles and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. A base station transceiver may operate multiple sectorized antennas. In the following, a cell may represent an according base station transceiver generating the cell or, likewise, a base station transceiver may represent a cell the base station transceiver generates.

The apparatus 40 may be comprised in a server, a base station, a NodeB, a UE, a transportation vehicle, a network component, a relay station, or any service coordinating network entity in disclosed embodiments. It is to be noted that the term network component may comprise multiple sub-components, such as a base station, a server, etc.

In exemplary embodiments the one or more interfaces 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 42 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 42 may be coupled to one or more antennas, which may correspond to any transmit and/or receive antennas, such as horn antennas, dipole antennas, patch antennas, sector antennas etc. In some examples the one or more interfaces 42 may serve the purpose of transmitting or receiving or both, transmitting and receiving, information, such as information, input data, control information, further information messages, etc.

As shown in FIG. 4 the respective one or more interfaces 42 are coupled to the respective control module 44 at the apparatus 40. In exemplary embodiments the control module 44 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In disclosed embodiments, communication, i.e., transmission, reception or both, may take place among mobile transceivers/vehicles directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In disclosed embodiments, the one or more interfaces 42 can be configured to wirelessly communicate in the mobile communication system, e.g., in an exemplary embodiment in which the apparatus 40 is implemented in a transportation vehicle 400 and the method 10, 20 is carried out at the transportation vehicle 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

For example, a first automated vehicle (AV) is in a deadlock situation. Multiple AVs were following it and are also stopping. If each AV detects its own deadlock situation, a cascade of ToD session requests is created, which would lead to an overload of the CC support system. The AV are then in a queue to solve the deadlock situation and each AV waits for the preceding transportation vehicle to solve the problem. That way, an overhead occurs, for example, as each new ToD session requires the CC to acquire a new understanding of the same scene. Disclosed embodiments may improve the management of this queuing system by enabling transportation vehicles in queue to identify and reference the deadlock situation.

For example, a combination of CC identification (ID) and deadlock ID may be used to have the AVs request a ToD session with the same CC operator as a preceding transportation vehicle. Disclosed embodiments may reduce the overhead related to understanding the situation at the CC. Indeed, once the CC operator has solved the problem for the first transportation vehicle, it can use its acquired knowledge to solve the same problem for the following transportation vehicles.

For example, in an exemplary embodiment the following operations may apply:
1. The first AV1 identifies the deadlock situation and assigns an ID, OB1, to the obstacle (which can be a stopped truck, a fell branch on the road etc.);
2. The first AV1 requests a ToD session and is connected to a command center CC1;
3. The CC1 assigns an ID, TOD1, to the ToD session and solves the problem;
4. The first AV1 broadcasts the fact that it is solving the problem OB1 by using the CC1 in the TOD1 session;
5. The second AV2, that is following AV1 in the queue, can include the IDs OB1 and TOD1 in its ToD request to be connected to CC1, which is already aware of the problem and does not need to understand the situation a second time, and not to a second CC2, which is unaware of the problem and needs to understand the situation; and
6. These operations may be repeated until the queue of transportation vehicles is empty.

For example, a technical effect of sharing the identification number of the obstacle and the command center may be to enable reuse of the same command center for the next automated transportation vehicle and therefore reduce the overhead time of understanding the scene.

In disclosed embodiments a deadlock situation may be defined as any situation, which cannot be interpreted by a scene interpreter of an AV. This may happen to the first AV that arrives at the deadlock situation. Using wireless communication, e.g., an according message, the first transportation vehicle informs subsequent transportation vehicles about the deadlock and its ID. After reception of this message subsequent transportation vehicles can prepare and request their respective ToD sessions including the ID. They may send their request to the same CC as the first transportation vehicle or to another CC, e.g., a CC of their respective operator. Further coordination may then be carried out between CCs, e.g., based on a ToD session ID or the deadlock ID, e.g., via a central traffic coordination entity. In some disclosed embodiments, CCs may develop or coordinate a common strategy on how to resolve the queue at the deadlock situation. For example, a sequence of transportation vehicles may be determined, which are tele-operated out of the deadlock situation. Other examples are a common trajectory or common waypoints to pass that allow maneuvering out of the deadlock situation.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for resolving a deadlock traffic situation in an autonomously operated transportation vehicle
11 detecting the deadlock traffic situation
12 reporting the deadlock traffic situation to a control center
13 entering a tele-operated driving session in coordination with the control center
14 determining information on an identification of the deadlock traffic situation in coordination with the control center
15 forwarding the information on the identification of the deadlock situation to other transportation vehicles
16 resolving the deadlock traffic situation using tele-operation by the control center
20 method for resolving a deadlock traffic situation in an autonomously operated transportation vehicle
21 receiving information on an identification of a deadlock traffic situation from another transportation vehicle
22 verifying that the information on the identification refers to an upcoming deadlock traffic situation
23 reporting the information on the identification to a control center
24 entering a tele-operated driving session in coordination with the control center to resolve the deadlock traffic situation if it comes up
30 method for resolving a deadlock traffic situation of an autonomously operated transportation vehicle in a control center
31 receiving information on a deadlock traffic situation from the autonomously operated transportation vehicle
32 determining information on an identification of the deadlock situation
33 tele-operating the transportation vehicle to resolve the deadlock traffic situation
34 storing information on the deadlock traffic situation for later use
40 apparatus for resolving a deadlock traffic situation of a transportation vehicle
42 one or more interfaces
44 control module
400 transportation vehicle, network component, control center

The invention claimed is:

1. An apparatus for resolving a deadlock traffic situation of an autonomously operated transportation vehicle, the apparatus comprising:
one or more interfaces to communicate in a communication network; and
a control module configured to control the one or more interfaces and to resolve the deadlock traffic situation by detecting the deadlock traffic situation of the autonomously operated transportation vehicle, reporting the deadlock traffic situation to a control center, entering a tele-operated driving session in coordination with the control center, determining information identifying the deadlock traffic situation in coordination with the control center, wherein the information identifying the deadlock traffic situation uniquely identifies the deadlock situation within a time frame and geographic region so as to differentiate the identified traffic situation from other deadlock situations in proximity to the geographic region during the time frame, forwarding the information identifying the deadlock situation to other autonomously operated transportation vehicles, and resolving the identified deadlock traffic situation using tele-operation by the control center, wherein the autonomously operated transportation vehicle is a first transportation vehicle discovering the deadlock situation and the autonomously operated transportation vehicle sets the information identifying the deadlock traffic situation.

2. An autonomously operated transportation vehicle comprising the apparatus of claim 1.

3. A control center comprising the apparatus of claim 1.

4. The apparatus of claim 1, wherein the control module is further configured to receive information identifying a tele-operation session from the control center and forward the information identifying the tele-operation session to the other autonomously operated transportation vehicles.

5. The apparatus of claim 1, wherein the determining of the information identifying the deadlock traffic situation in coordination with the control center comprises assigning an identifier to the deadlock traffic situation and reporting the information on the assigned identifier of the deadlock traffic situation to the control center.

6. A method for resolving a deadlock traffic situation in an autonomously operated transportation vehicle, the method comprising:
  detecting the deadlock traffic situation by the autonomously operated transportation vehicle;
  reporting the deadlock traffic situation to a control center;
  entering a tele-operated driving session in coordination with the control center;
  determining information identifying the deadlock traffic situation in coordination with the control center, wherein the information identifying the deadlock traffic situation uniquely identifies the deadlock situation within a time frame and geographic region so as to differentiate the identified traffic situation from other deadlock situations in proximity to the geographic region during the time frame, and wherein the autonomously operated transportation vehicle is a first transportation vehicle discovering the deadlock situation and the autonomously operated transportation vehicle sets the information identifying the deadlock traffic situation;
  forwarding the information identifying the deadlock situation to other autonomously operated transportation vehicles; and
  resolving the identified deadlock traffic situation using tele-operation by the control center.

7. The method of claim 6, further comprising receiving information identifying a tele-operation session from the control center and forwarding the information identifying the tele-operation session to the other autonomously operated transportation vehicles.

8. The method of claim 6, wherein the determining of the information identifying the deadlock traffic situation in coordination with the control center comprises assigning an identifier to the deadlock traffic situation and reporting the information on the assigned identifier of the deadlock traffic situation to the control center.

9. A method for resolving a deadlock traffic situation in an autonomously operated transportation vehicle, the method comprising:
  receiving information identifying a deadlock traffic situation from another autonomously operated transportation vehicle, wherein the information identifying the deadlock traffic situation uniquely identifies the deadlock situation within a time frame and geographic region so as to differentiate the identified traffic situation from other deadlock situations in proximity to the geographic region during the time frame, wherein a first transportation vehicle discovering the deadlock situation sets the information identifying the deadlock traffic situation;
  verifying that the information identifying the deadlock traffic situation refers to an upcoming deadlock traffic situation;
  reporting the information identifying the deadlock traffic situation to a control center; and
  entering a tele-operated driving session in coordination with the control center to resolve the deadlock traffic situation in response to the deadlock traffic situation occurring.

10. The method of claim 9, further comprising receiving information identifying a tele-operation session from the other autonomously operated transportation vehicle and reporting the information identifying the tele-operation session to the control center.

11. The method of claim 9, wherein the information identifying the tele-operation session indicates a tele-operation session of a specific control center and wherein the reporting comprises reporting to the specific control center.

12. The method of claim 9, wherein the verifying comprises determining whether the autonomously operated transportation vehicle is in queue behind the other autonomously operated transportation vehicle.

13. A method for resolving a deadlock traffic situation of an autonomously operated transportation vehicle in a control center, the method comprising:
  receiving information on a deadlock traffic situation from the autonomously operated transportation vehicle;
  determining information identifying the deadlock situation, wherein the information identifying the deadlock traffic situation uniquely identifies the deadlock situation within a time frame and geographic region so as to differentiate the identified traffic situation from other deadlock situations in proximity to the geographic region during the time frame, and wherein the autonomously operated transportation vehicle is a first transportation vehicle discovering the deadlock situation and the autonomously operated transportation vehicle sets information identifying the deadlock traffic situation;
  tele-operating the autonomously operated transportation vehicle to resolve the deadlock traffic situation; and
  storing information on the deadlock traffic situation for later use.

14. The method of claim 13, further comprising determining information identifying a tele-operation session used for tele-operating the autonomously operated transportation vehicle to resolve the deadlock traffic situation and providing the information identifying the tele-operation session to the autonomously operated transportation vehicle.

15. The method of claim 13, further comprising:
  receiving information identifying the deadlock traffic situation from another autonomously operated transportation vehicle;
  retrieving the information on the deadlock traffic situation based on the information identifying the deadlock situation; and tele-operating the other autonomously operated transportation vehicle based on the information on the deadlock traffic situation.

16. The method of claim 15, further comprising receiving information on a tele-operation session from the other autonomously operated transportation vehicle and coordinating the tele-operating of the other autonomously operated transportation vehicle based on the information on the tele-operation session.

17. A non-transitory computer readable medium including a computer program having a program code for performing the method of claim 6, when the computer program is executed on a computer, a processor, or a programmable hardware component.

\* \* \* \* \*